(12) United States Patent
Minhas et al.

(10) Patent No.: US 8,555,642 B2
(45) Date of Patent: Oct. 15, 2013

(54) METHODS OF UTILIZING WASTE HEAT FOR CREATING A PRESSURIZED WORKING FLUID

(75) Inventors: Bhupender S. Minhas, Bridgewater, NJ (US); Sufang Zhao, Vienna, VA (US); Mohsen S. Yeganeh, Hillsborough, NJ (US); Tahmid I. Mizan, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 241 days.

(21) Appl. No.: 13/033,673

(22) Filed: Feb. 24, 2011

(65) Prior Publication Data

US 2011/0219770 A1    Sep. 15, 2011

Related U.S. Application Data

(60) Provisional application No. 61/312,066, filed on Mar. 9, 2010.

(51) Int. Cl.
*F01K 13/00* (2006.01)
*F25B 41/00* (2006.01)

(52) U.S. Cl.
USPC .............................. 60/645; 62/113

(58) Field of Classification Search
USPC ..................... 60/645, 113; 62/113
See application file for complete search history.

(56) References Cited

U.S. PATENT DOCUMENTS

| | | | |
|---|---|---|---|
| 4,312,640 A * | 1/1982 | Verrando | 95/105 |
| 4,469,588 A * | 9/1984 | Hettinger et al. | 208/77 |
| 4,694,659 A | 9/1987 | Shelton | |
| 5,157,203 A * | 10/1992 | Brown et al. | 585/845 |
| 5,526,648 A * | 6/1996 | Wertenbach et al. | 62/101 |
| 5,823,003 A | 10/1998 | Rosser, Jr. et al. | |
| 6,007,706 A * | 12/1999 | Carnell et al. | 208/303 |
| 6,071,410 A * | 6/2000 | Nau et al. | 210/635 |

(Continued)

FOREIGN PATENT DOCUMENTS

| | | |
|---|---|---|
| AT | 500938 A2 | 5/2006 |
| CA | 2740612 A1 | 10/2009 |

(Continued)

OTHER PUBLICATIONS

PCT Search Report issued Mar. 13, 2013 in corresponding PCT Application No. PCT/US2011/027344, 5 pgs.

(Continued)

*Primary Examiner* — Kenneth Bomberg
*Assistant Examiner* — Shafiq Mian
(74) *Attorney, Agent, or Firm* — Glenn T. Barrett; Malcolm D. Keen

(57) ABSTRACT

A method of utilizing waste heat to create a pressurized working fluid is disclosed. The method includes providing a vessel containing a sorbent system, introducing a feed of waste heat to a heat exchanger external to the vessel to heat a feed of working fluid, introducing the heated working fluid from the heat exchanger to the vessel to obtain pressurized working fluid, and directing the pressurized working fluid from the vessel to a work component. The method is particularly suited to make use of waste heat an industrial process, (e.g., a chemical processing or petrochemical refining operation) in which low grade heat source(s) are used to drive the sorption system.

16 Claims, 8 Drawing Sheets

(56) References Cited

U.S. PATENT DOCUMENTS

| | | | |
|---|---|---|---|
| 6,077,488 A | 6/2000 | Jain et al. | |
| 6,269,644 B1* | 8/2001 | Erickson et al. | 60/649 |
| 6,364,938 B1* | 4/2002 | Birbara et al. | 95/139 |
| 6,387,337 B1* | 5/2002 | Pennline et al. | 423/220 |
| 6,417,420 B1* | 7/2002 | Stewart et al. | 585/323 |
| 6,503,297 B1* | 1/2003 | Lu et al. | 95/96 |
| 6,537,353 B2* | 3/2003 | Holst et al. | 96/108 |
| 6,715,290 B1* | 4/2004 | Erickson | 60/671 |
| 6,746,515 B2* | 6/2004 | Wegeng et al. | 95/96 |
| 6,755,892 B2* | 6/2004 | Nalette et al. | 95/11 |
| 7,258,169 B2* | 8/2007 | Fripp et al. | 166/302 |
| 7,654,330 B2* | 2/2010 | Zubrin et al. | 166/369 |
| 7,722,773 B2* | 5/2010 | Honji et al. | 210/673 |
| 7,735,325 B2* | 6/2010 | Ruggieri et al. | 60/651 |
| 2004/0107832 A1* | 6/2004 | Tongue et al. | 95/96 |
| 2007/0051238 A1 | 3/2007 | Jain et al. | |
| 2008/0237131 A1* | 10/2008 | Brown et al. | 210/656 |
| 2009/0038477 A1 | 2/2009 | Abe et al. | |
| 2010/0132359 A1 | 6/2010 | Minhas et al. | |
| 2011/0232493 A1 | 9/2011 | Yeganeh et al. | |

FOREIGN PATENT DOCUMENTS

| | | |
|---|---|---|
| DE | 3700707 A1 | 7/1988 |
| GB | EP 1566546 A1 * | 8/2005 |
| WO | 2007111738 A2 | 10/2007 |
| WO | 2008009911 A2 | 1/2008 |

OTHER PUBLICATIONS

PCT Written Opinion issued Mar. 13, 2013 in corresponding PCT Application No. PCT/US2011/027344, 8 pgs.

International Search Report issued in corresponding PCT Application No. PCT/US2011/027344, mailed Jan. 9, 2013 (2 pp.).

Wang et al., "Colossal Cages In Zeolitic Imidazolate Frameworks As Selective Carbon Dioxide Reservoirs", Nature, vol. 453, pp. 207-211, May 8, 2008, Nature Publishing Group.

* cited by examiner

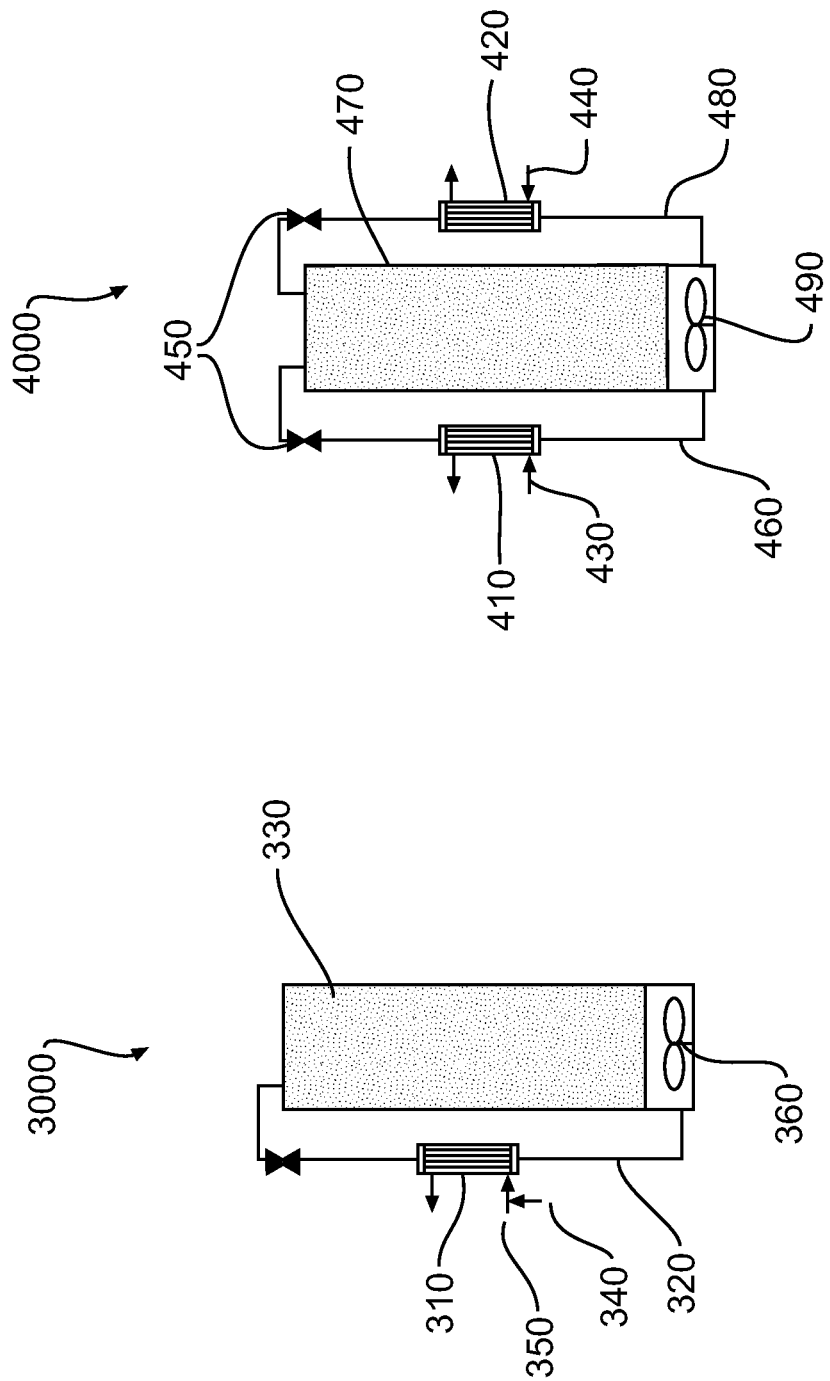

METHODS OF UTILIZING WASTE HEAT FOR CREATING A PRESSURIZED WORKING FLUID

CROSS REFERENCE TO RELATED APPLICATIONS

This application relates and claims priority to U.S. Provisional Application No. 61/312,066, entitled "Sorption Systems Having Improved Cycle Times", filed on Mar. 9, 2010. This application relates to co-pending U.S. patent application Ser. No. 13/033,666, filed concurrently herewith.

FIELD OF THE INVENTION

The present invention relates to process modifications and apparatus designs that are to minimize the cycle time between hot and cold temperature swing of the sorption bed. In particular, the present invention is directed to design changes in adsorption bed to provide faster cycle times. This includes the direct heating and cooling of adsorbents with heating and cooling media using adsorbents that are unwettable with heating and cooling media. Such process modifications and designs are particularly suited to make use of previously unutilized heat from an industrial process, (e.g., a chemical processing or petrochemical refining operation) in which low grade heat source(s) are used to drive the sorption system.

BACKGROUND OF THE INVENTION

Chemical processing operations, including petroleum refining and petrochemical operations, are energy intensive. It is often necessary to conduct these operations at high temperatures using high temperature heat sources including but not limited to steam. After the steam and other hot streams have performed their intended functions, there remains "waste" energy that can be further utilized. Refineries and petrochemical facilities typically utilize only about 70% of the input energy needed to conduct processing of crude oil to products.

In an effort to increase efficiency, it is desirable to recover and utilize unutilized heat. One method described in U.S. Pat. No. 5,823,003 to Rosser et al. attempts to make use of waste heat and apply such heat to an adsorbent material in order to release an adsorbed gas at a higher pressure, which in turn can be used in a power generation or a refrigeration cycle that contains an expansion valve. U.S. Pat. No. 5,823,003 describes the use of a zeolite-water combination for a sorption refrigeration system.

Current methods to obtain refrigeration and work from sorbent materials in chemical process applications have their limitations. The temperature swings ($\Delta T$) afforded using lower grade heat sources, such as waste heat, are less than that which would be provided using primary heat sources. These methods also have longer cycle times. Such limitations often render the recovery of useful from waste heat economically unsustainable.

Accordingly, there remains a need to improve unutilized heat recovery efforts (e.g. waste heat recovery) and render them more cost-effective by providing the opportunity to utilize all grades of unutilized heat, to reduce equipment and space requirements of the process. There also remains a need to provide other uses, besides refrigeration, of the working fluid released from unutilized heat-charged sorbent materials.

SUMMARY OF THE INVENTION

One aspect of the present invention provides a sorption system that includes a vessel containing a sorbent material, and a heat exchanger external to the vessel adapted to receive a feed of waste heat to heat a feed of working fluid. The vessel containing the sorbent material is adapted to receive the feed of the heated working fluid from the heat exchanger.

A second aspect of the present invention provides an adsorption bed that includes an adsorbent substrate having at least one channel defined therein, and a surface layer applied to the channel of the adsorbent substrate. The channel is adapted to receive a source of working fluid and heating or cooling fluid for direct interaction with the surface layer.

A third aspect of the present invention provides a sorption system that includes a first vessel section at a first temperature adapted to receive a feed of waste heat, a second vessel section at a second temperature adapted to receive a feed of cooling fluid; a sorbent material capable of being moved between the first vessel section and the second vessel section. and a feed of working fluid adapted to flow through at least the second vessel section. In one embodiment the sorbent material is moved using a lock-hopper device. In an alternative embodiment, the sorbent material is moved using a piston device. In a still alternative embodiment, the sorbent material is rotated between the first vessel section and the second vessel section.

BRIEF DESCRIPTION OF THE DRAWINGS

FIG. 3 is a schematic of an adsorption process according to one aspect of the presently disclosed subject matter that employs an adsorbent packed bed (e.g., a bed packed with zeolite 13X) and an external heat exchanger that is adapted to receive a feed of waste heat and a feed of working fluid (e.g., $CO_2$). This process (and the process of FIG. 4) also includes a magnetic drive fan to circulate working fluid through the heat exchanger.

FIG. 4 is a schematic of an adsorption process according to an alternative embodiment that employs an adsorbent packed bed (e.g. packed with zeolite 13X), a first external heat exchanger that is adapted to receive a feed of waste heat and a feed of working fluid (e.g., $CO_2$), and a second heat exchanger adapted to receive a feed of cooling fluid (e.g. cold water) and a feed of working fluid. In this embodiment, the waste heat and cooling fluid feeds are configured such that they can be sent to the alternative heat exchanger.

DETAILED DESCRIPTION OF THE INVENTION

The present invention will now be described in greater detail in connection with the Figures and the following terms.

As used herein, the term "sorbent material" refers to a material that reversibly binds to a working fluid. Sorbent materials include, but are not limited to, adsorbents and absorbents.

As used herein, the term "working fluid" refers to a liquid or gas that can reversibly bind to the sorbent material, either in a chemical or physical sense. When the sorbent material is a liquid, the sorbent material should absorb the working fluid, and thus the sorbent material can be referred to as an absorbent material. When the sorbent material is a solid, the sorbent material should adsorb the working fluid, and thus the sorbent material is an adsorbent material.

As used herein, the term "total temperature swing time" refers to one complete cycle including cooling down the sorbent material to enable $CO_2$ adsorption and then heating up the sorbent material to release high pressure $CO_2$.

As used herein, the term "Taylor flow regime," also known as a "slug flow regime," refers to a flow of liquids and gas in a two-phase capillary in which gas bubbles form with lengths that are greater than the tube diameter that move along the capillary separated from each other by liquid slugs. Depending on the gas and liquid flow rates and properties, the bubbles often have hemispherical-like tops and bottoms.

As used herein, the term "driver device" refers to a turbine, shaft or other mechanism driven by a working fluid to generate electricity or work.

As used herein, the term "vessel" refers to a container suitable for containing a sorbent material and a working fluid under suitable conditions to permit sorption (e.g. adsorption or absorption) and desorption.

As used herein, the term "waste heat," "unutilized heat" or "unutilized heat source" refers to the residual or remaining heat (e.g. steam) following the processing operation after the heat sources has been used for its primary purpose in the refining or petrochemical processing operation. Unutilized heat is also referred to as "waste heat." The unutilized heat or unutilized heat source is often a heat source that is no longer of any use in refining and/or petrochemical processing operation and would traditionally be discarded. The unutilized heat can be provided as an unutilized heat stream. For example, but not limitation, unutilized heat can include steam that was employed in a heat exchanger used in petroleum and petrochemical processing.

Reference will now be made to various aspects and embodiments of the disclosed subject matter in view of the definitions above. Reference to the methods will be made in conjunction with, and understood from, the systems disclosed herein.

Figure 1:
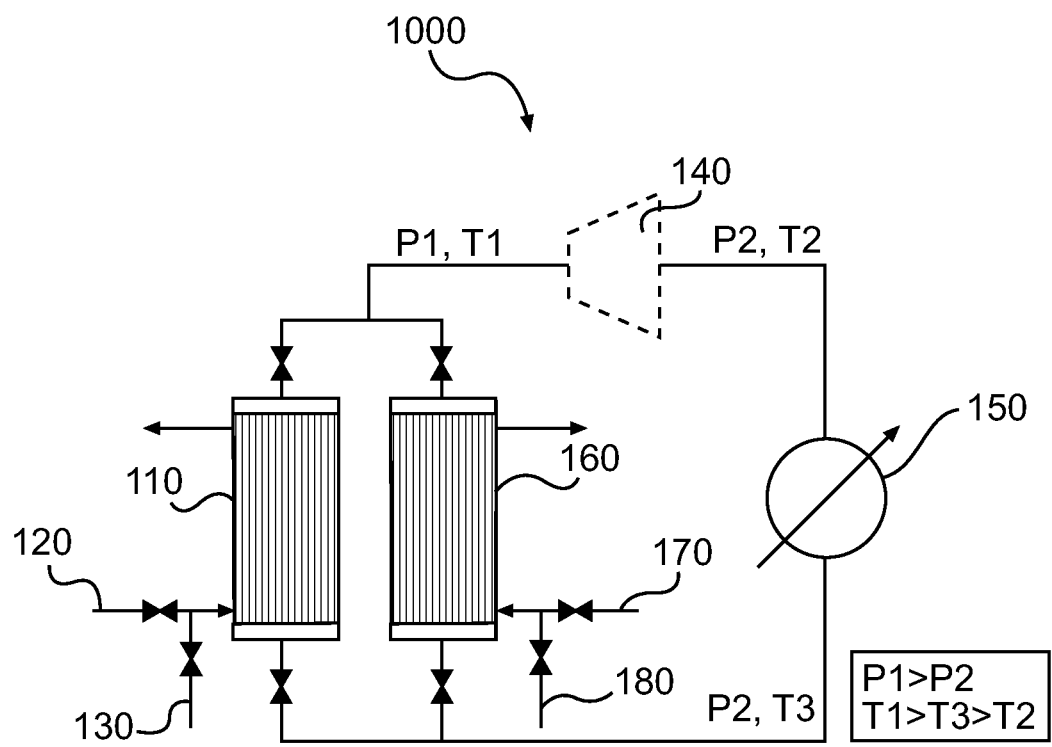
FIG. 1 is a schematic of an exemplary adsorption process that employs waste heat to generate electricity and chilling combined.

For the purpose background and not admission of prior art, a conventional adsorption system 1000 is shown in FIG. 1. An adsorption bed (110) is provided, that contains tubes packed with adsorbents (e.g., MOFs/ZIFs/Zeolites/Carbon). The adsorption bed is adapted to receive either a feed of waste heat (120) or cold water (130). During an adsorption stroke, the adsorption bed is provided with a feed of cold water and the adsorbents adsorb working fluid (e.g., $CO_2$) at a lower temperature, T3, and lower pressure, P2. The cold water supply is valved off, and a feed of waste heat is then fed to the adsorption bed to heat the adsorbent bed to T1 (>T2) to release adsorbed working fluid. The heating increases the pressure of the released working fluid P1 (>P2) into the supercritical region.

The pressurized working fluid is introduced to a turboexpander (140) to generate electricity. Downstream of the turboexpander, working fluid is now at a lower pressure, P2 and lower temperature, T2. The thermodynamic conditions are such that the working fluid is in an at least partially condensed phase. After exiting the turboexpander, the condensed working fluid is fed to an evaporator (150) to chill a given process stream in the refinery, which in turn increases the temperature of the working fluid to T3. The working fluid is again introduced to adsorption bed and the process is repeated.

The adsorption system shown in FIG. 1 is equipped with a second adsorption bed (160), also adapted to receive a feed of either waste heat (170) or cold water (180). Having two adsorption beds in parallel allows one adsorption bed to operate in an adsorption mode (adsorption stroke) while the other adsorption bed is operating in a desorption mode.

Figure 2:
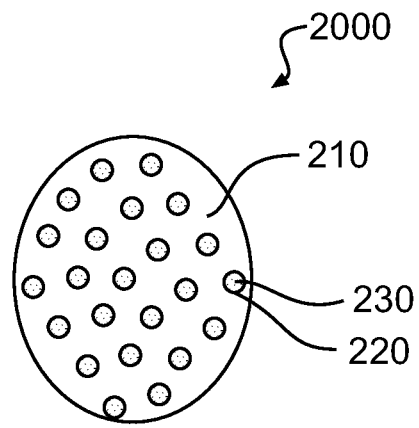
FIG. 2 is a shell and tube adsorbent bed design of the prior art.

A shell and tube adsorption bed (2000) is shown in FIG. 2, in which heating and cooling media (210) transfers heat through tube walls (220). The adsorbent (230) is packed inside the tubes.

This design has disadvantages; the indirect heating and cooling of the adsorbent results in a slower heat transfer rate and longer temperature swing cycle times. Consequently, this design requires bigger beds and/or multiple beds (increased infrastructure footprint) which increases the cost of the adsorption system.

Another disadvantage of the shell and tube configuration shown in FIG. 2 is that adsorbents occupy only partial vessel volume. For example, if one were to take advantage of higher pressure ratings of tubes versus the vessel, as shown in FIG. 2, for example, only about ⅓ of the entire vessel would contain adsorbent.

One aspect of the present invention provides a sorption system that includes a vessel containing a sorbent material, and a heat exchanger external to the vessel adapted to receive a feed of waste heat to heat a feed of working fluid. The vessel containing the sorbent material is adapted to receive the feed of the heated working fluid from the heat exchanger. The sorbent material and the working fluid in combination can have a pressure index of at least 1.2, or at least 1.5, or at least 2, or at least 3, or at least 4, or at least 6, or at least 8, or greater.

In a further embodiment, the sorption system includes a chilling system, which can include an expansion valve in fluid communication with the vessel containing the sorbent material, whereby a refrigerant is produced by introducing pressurized working fluid to the expansion valve. In an alternative embodiment, the sorption system includes a generator system, such as a turboexpander in fluid communication with the vessel containing the sorbent material, whereby electricity is produced by introducing pressurized working fluid to the turboexpander.

For purposes of illustration and not limitation, reference is made to a representative embodiment of an adsorption process design according to one aspect of the presently disclosed subject matter as generally shown in FIG. 3. According to this embodiment (3000), a faster heat and cooling cycle is provided to heat/cool the working fluid (e.g., $CO_2$) by employing an external heat exchanger (310). During a heating cycle, working fluid exiting the heat exchanger (320) is introduced to an adsorbent packed bed (330). This allows working fluid to directly transfer heat to adsorbents allowing for faster heat transfer. This embodiment provides for small adsorption beds, as practically the entire vessel volume can be used for adsorbent packing.

In the embodiment shown in FIG. 3, the heat exchanger is adapted to receive a feed of waste heat (340) which drives the desorption cycle. In order to regenerate the adsorbent bed, the waste heat feed is valved off (not shown) and instead, a feed of cooling media (e.g. cold water (350) such as river water) is introduced to the heat exchanger in order to cool the working fluid for introduction and ultimate adsorption by the adsorbent packed bed.

The embodiment shown in FIG. 3 employs a fan device (360), such as a magnetic drive fan/blower, to circulate working fluid through the heat exchanger and the adsorbent bed. It is noted that the fan device is not required for pressurization. Pressurization ($\Delta P$) is obtained using waste heat which desorbs working fluid at a higher temperature from the adsorbent, while adsorbing the fluid during cooling cycles. Thus the adsorbent acts as a compressor. During heating cycles, the desorbed working fluid can be introduced to, for example, an expansion valve and/or a turboexpander (not shown). In accordance with the present invention, the expansion valve and the turbo expander may be on the same line as heat exchanger with a control valve to divert the $CO_2$ flow to expansion valve and turboexpander when certain $CO_2$ pressure is reached during desorption In an alternative embodiment (4000) as shown in FIG. 4, two heat exchangers (910, 420) are employed in parallel. One heat exchanger (410) is adapted to receive a feed of waste heat (430) and is dedicated to the heating cycle of the sorption system. A second heat exchanger (420) is adapted to receive a feed of cooling media, such as cold water (440). In this configuration, there are two heat exchangers. With this arrangement, the heating and cooling media do not have to be miscible. Separate media may be employed (e.g., the heating media may be a hydrocarbon hot stream and the cooling media may be cooling tower cold water). Through appropriate valving (450) the heat exchanger system can be configured to provide either a heated working fluid (460) to the adsorbent bed (470) during a desorption stroke, or a cooled working fluid (480) during a sorption stroke. A fan device, such as a magnetic drive fan/blower (490), circulates the working fluid through the adsorption bed and the appropriate heat exchanger.

A second aspect of the present invention provides an adsorption bed that includes an adsorbent substrate having at least one channel defined therein, and a surface layer or coating applied to the channel of the adsorbent substrate. The channel is adapted to receive a source of working fluid and heating or cooling fluid for direct interaction with the surface layer.

In one embodiment, the surface layer is a hydrophobic polymeric layer that protects the adsorbent substrate from direct contact of heating and cooling fluid so that heating and cooling fluid does not adsorb in the adsorbents and reduce its capacity for working fluid.

The adsorption bed can be implemented into any adsorption system, including, but not limited to, the adsorption systems described herein. In a preferred embodiment, waste heat is used to drive the adsorption system. The highly pressurized working fluid obtained from the adsorption system can be introduced to, for example, an expansion valve to provide refrigeration and/or a turboexpander to provide electricity.

For purposes of illustration and not limitation, a representative embodiment of an adsorption bed design according to one aspect of the presently disclosed subject matter is generally shown in FIG. 5. A structured adsorbent packing (e.g., an adsorbent monolith) is used as an adsorbent bed. In this embodiment, zeolite 13X is used as the adsorbent. The present invention is not intended to be limited to the use of zeolite 13X; rather, other catalysts having similar properties are considered to be well within the scope of the present invention. The monolith 13X is coated with a hydrophobic polymer layer which does not allow heating/cooling media (e.g. water or glycol) to wet the monolith surface. This design can be incorporated by person of ordinary skill in various adsorption processes, such as, but not limited to, the process depicted in FIGS. 1 and 9. The liquid layer is a heating/cooling media (water or TEG) layer that does not move with the gas. The liquid layer is in contact with monolith.

Figure 5A:
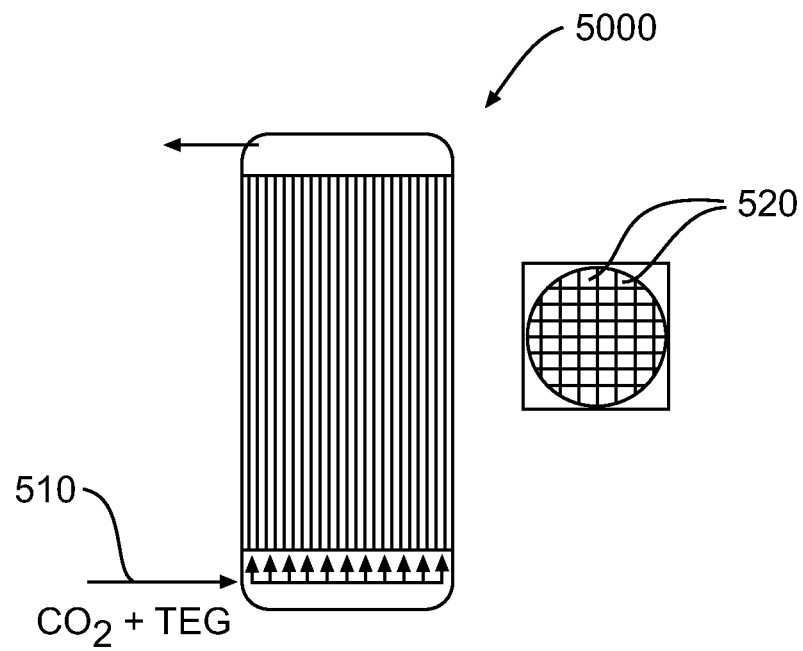
FIG. 5A and FIG. 5B illustrate a schematic of structured sorbent packing (e.g., a zeolite monolith) for direct heating/cooling with heating media (e.g. waste heat) and cooling media according to one aspect of the presently disclosed subject matter. The working fluid (e.g., $CO_2$) flows together with the heating and cooling media in the channels of the structured sorbent packing
Figure 5B:
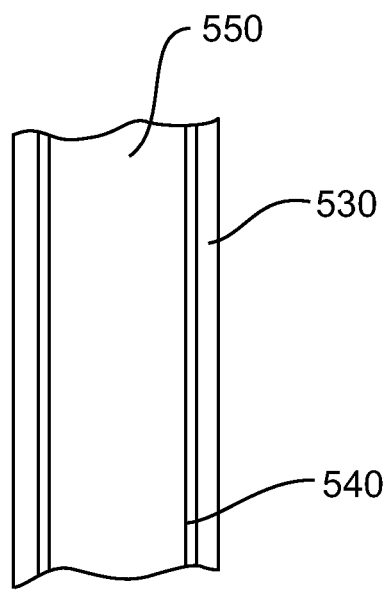

According to the embodiment (5000) shown in FIG. 5A and FIG. 5B, a feed (510) containing both working fluid (e.g., $CO_2$) and heating/cooling media (e.g., triethylene glycol (TEG)) is introduced to the adsorption bed. The heating or cooling media 550 is contained in the channel 520. The $CO_2$ is injected in the cooling media for adsorption on monolith. The monolith is not wetted with heating or cooling media and $CO_2$ diffuses through liquid (eg TEG) film to adsorb on monolith. The diffusion of $CO_2$ through liquid film layer 540 controls the adsorption rate. Internally, the monolith adsorption bed contains a multitude of channels (520), in which the adsorbent is contained along the entire length (or substantially the entire length) of the channel. Because the working fluid is directly heated by the heating media, the temperature swing cycle can be much smaller as compared to what is feasible in designs that rely on indirect heating and cooling (e.g., less than 30 seconds, or less than 20 seconds). Thus, this design is particularly suitable for adsorption systems that employ low grade heat sources, such as waste heat.

In this particular embodiment, the channels contain an exterior wall (530) of the adsorbent with an liquid film coating (540), which formed during flow of TEG and CO2 together, applied on the interior surface thereof. The liquid film can be the same as the cooling media (550), or different, so long as it protects the adsorbent from the cooling/heating media while allowing for diffusion of the working fluid therethrough for adsorption and desorption onto the adsorbent.

The flow regimes of working fluid can be adjusted to reduce the liquid film thickness (e.g. the thickness of the triethylene glycol layer) on the monolith surface. In one embodiment, a Taylor flow regime is employed. Sample calculations indicate that if TEG is used as the heating/cooling media for a monolith having a channel diameter of 0.8 mm, it takes less than 5 seconds for $CO_2$ to diffuse through the TEG film to reach the monolith. The total temperature swing time for such an embodiment would be about 15 seconds. Flow regimes depend on numerous factors including but not limited to channel dimension, gas and liquid density, gas and liquid viscosity, surface tension, gas and liquid superficial velocity. In accordance with the present invention, in order to promote Taylor flow within the system, smaller channel diameters and liquids with higher viscosity are utilized.

A third aspect of the present invention provides a sorption system that includes a first vessel section at a first temperature adapted to receive a feed of waste heat, a second vessel section at a second temperature adapted to receive a feed of cooling fluid; a sorbent material capable of being moved between the first vessel section and the second vessel section. and a feed of working fluid adapted to flow through at least the second vessel section. In one embodiment the sorbent material is moved using a lock-hopper device. In an alternative embodiment, the sorbent material is moved using a piston device. In a still alternative embodiment, the sorbent material is rotated between the first vessel section and the second vessel section.

Figure 6:
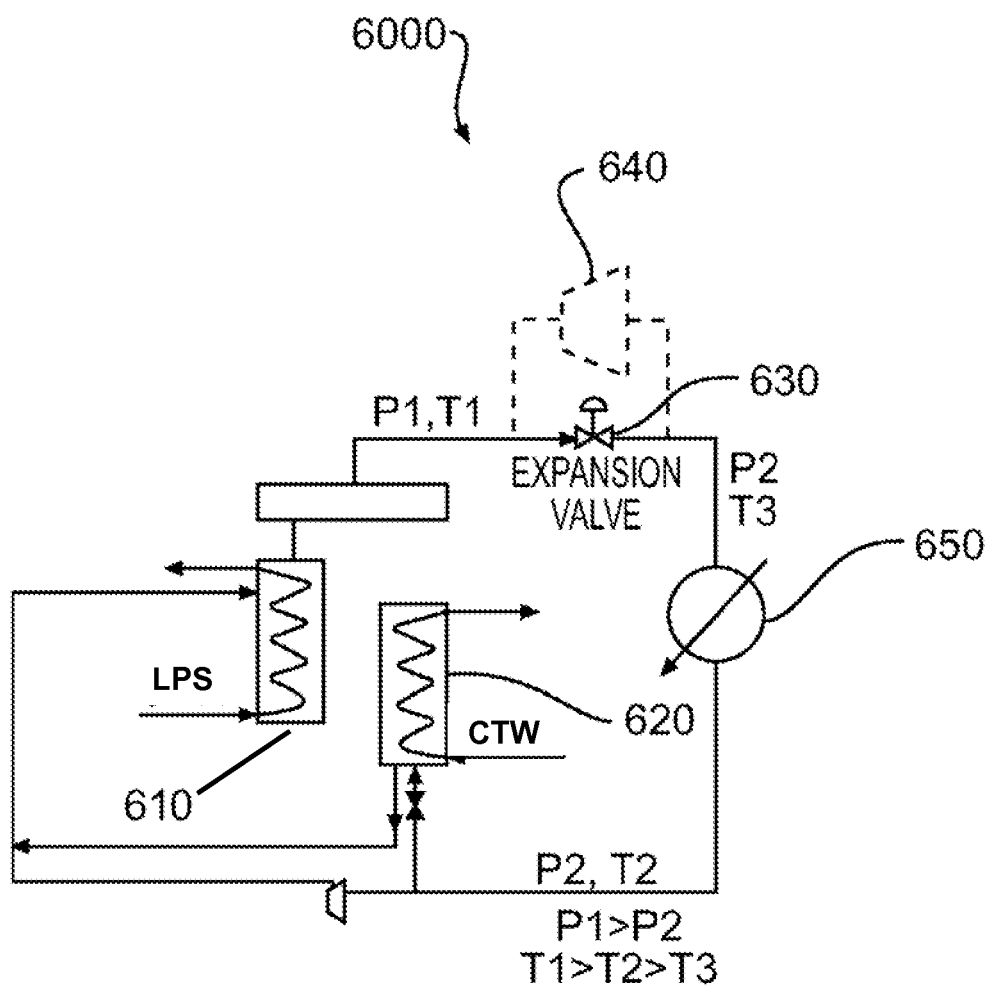
FIG. 6 is a schematic of an adsorption process according to an alternative aspect of the presently disclosed subject matter, in which adsorbents circulating on a continuous basis between hot to cold vessels adapted to receive a feed of waste heat. Solid adsorbents are moved from one vessel to another using a mechanism such as lock-hopper which keeps two vessels maintained at different pressures and temperatures

For purpose of illustration and not limitation, a representative embodiment of an adsorption process design according to one aspect of the presently disclosed subject matter is generally shown in FIG. 6, which involves moving the adsorbent particles between heating and cooling zones. According to one embodiment of this aspect (6000), two vessels (610 and 620) are maintained at a high and low temperature, respectively, and adsorbent is moved between the cold and hot vessels. In one embodiment, the adsorbent is moved on a continuous basis.

In the cold vessel 620, adsorption takes place. In the hot vessel 610, desorption occurs, thereby generating high pressure working fluid (e.g., $CO_2$). In this embodiment, the hot vessel 610 is adapted to receive a feed of waste heat and the cold vessel 620 is adapted to receive a feed of cooling fluid (e.g. river water or cooling tower water (CTW), as shown). A low pressure stream (LPS) which usually is waste, is used as waste heat source for vessel 610. The desorbed working fluid can be introduced to an expansion valve (630) and/or turboexpander (640) or the like at pressure and temperature P1, T1, and after expansion and cooling to P2, T3, may also be used to cool a process stream (e.g. using a chiller system, (650)) from which it emerges at pressure and temperature P2, T2.

The process design of FIG. 6 relies on isolating the high pressure, hot vessel from the low pressure, cold vessel while moving the adsorbent particles from one vessel to the other. This can be achieved, for example, using a lock-hopper technique, which moves the adsorbent from one vessel to the other while maintaining the two vessels at their desired temperatures and pressures.

Figure 7:
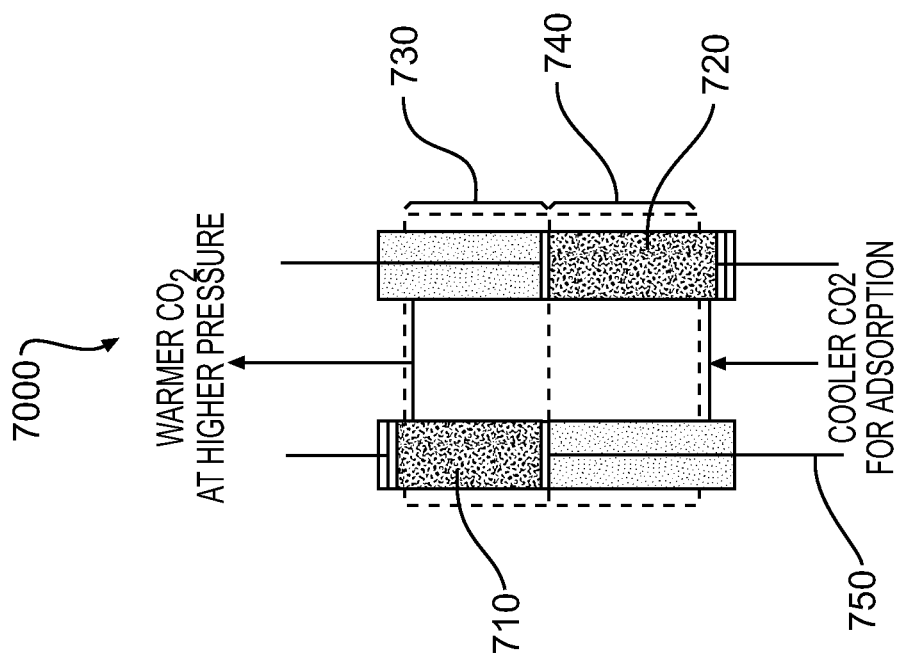
FIG. 7 is a schematic of an adsorption process according to an alternative embodiment of the presently disclosed subject matter in which adsorbent beds are moved between cold to hot zones using a piston device in order to create high pressure working fluid for power and chilling.

An alternative embodiment (7000) is set forth in FIG. 7. Adsorbent beds (710 and 720) are moved between hot zones (730) and cold zones (740) using a piston device (750). The warm zone provides a desorption stroke, yielding high pressure working fluid (e.g., $CO_2$) that can be introduced to an expansion valve, turbo-alternator/expander and/or a chiller device or evaporator apparatus (not shown). The cool zone provides an adsorption stroke, in which the adsorbent bed can be regenerated simultaneously with the operation of the desorption stroke.

Figure 8:
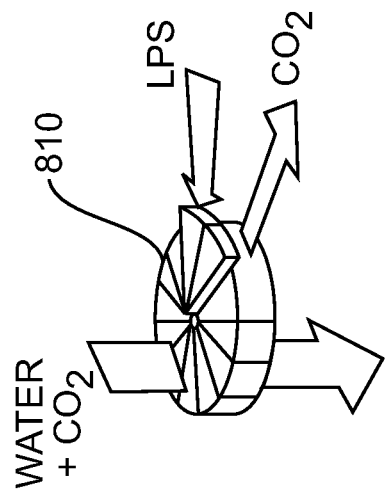
FIG. 8 is an illustration Rotary wheel design for moving adsorbents between hot and cold zones for creating pressurized $CO_2$ for generating power and subsequent chilling.

An alternative embodiment (8000) is set forth in FIG. 8, in which the adsorbents are housed in a rotary wheel. The rotary wheel is adapted to receive a feed of working fluid and cooling media (e.g., water). Pressurized working fluid obtained from a desorption stroke can be used to generate power and/or for subsequent chilling.

While the working fluid is, for purposes of simplicity, largely described in the context of $CO_2$, other working fluids can be employed. In one embodiment, the working fluid is a gas and is selected from carbon dioxide, methane, ethane, propane, butane, ammonia, chlorofluorocarbons (e.g., Freon™), other refrigerants, or other suitable fluids. Similarly, the sorbent material is largely described in the context of zeolite 13X, but is not limited thereto. In one embodiment, the sorbent material is selected from zeolites, silicagel, carbon, activated carbon, metal organic frameworks (MOFs), and zeolitic imidazolate frameworks (ZIFs). In one embodiment the working fluid is carbon dioxide and/or the sorbent material is a zeolite. In one embodiment the working fluid is carbon dioxide and the zeolite is a zeolite X, preferably a zeolite 13X.

In one embodiment the heating is provided by waste heat from a chemical processing or petrochemical refining operation. In one embodiment, the unutilized heat ranges from about 343K to about 573K, or more preferably from about 363K to about 453K.

The highly pressured working fluid obtained from desorption strokes are not limited to the uses described herein, which include refrigeration, electricity and other work. In one embodiment the refrigeration is used to provide cooling water to an overhead condenser in a distillation tower. In another embodiment, the refrigeration is used to recover gas molecules from a fuel stream. Alternatively, a work shaft can be provided and mechanical work is provided. The mechanical work can be used, for example, to run an engine.

In one embodiment, the sorption process is used to simultaneously provide electricity (via contact with, for example, a turboexpander) and cooling (via subsequent contact with, for example a cooling device).

Pressure Index

Embodiments of the present application employ a "pressure index" that can be determined at various desorbing temperatures. The pressure index is used to determine suitable combinations of a sorbent material and a working fluid. These combinations are especially adaptable to be used in the process modifications and apparatus designs also disclosed herein, since they collectively maximize pressurization of working fluid ($\Delta P$) from available energy sources, which are often, but not necessarily, low grade heat sources primarily intended to be used for some other specific purpose (e.g., waste heat).

The pressure index is determined by the following method. One hundred (100) grams of sorbent material are placed in a 1 liter vessel designed to be isolated from associated equipment with existing valves on both ends of the vessel. The vessel also has indicators to measure inside pressure and temperature. The vessel is flushed and filled with a pure fluid (e.g., $CO_2$) at one atmospheric pressure. The sorbent material adsorbs fluid and the sorbent may heat up. The vessel is equilibrated at 298 K and 1 atmospheric pressure, this sorbing pressure being defined as $P_I$=1.0. The vessel is heated to a pre-selected desorbing temperature (e.g. 348 K). When the vessel and sorbent material reach the pre-selected desorbing temperature, the internal vessel pressure is measured to determine $P_F$. The pressure index is defined as the ratio of $P_F$ to $P_I$.

As noted above, preferred embodiments of the present application make use of a lower grade of unutilized heat (e.g. waste heat). In order to select a sorbent material/fluid combination that is preferred for use with low grade heat (e.g. sorption systems that utilize low grade waste heat), it is often desirable or necessary to ascertain at least the low level heat pressure index, as determined above. A pressure index of at least 1.5 is generally appropriate for use in low level unutilized heat applications. Nevertheless, other embodiments of the present invention can use high level heat sources. Thus in these embodiments, it is desirable to select a high level heat pressure index. In such cases, combinations of sorbent material and working fluid can have a pressure index as low as 1.2.

Sorbent Materials

As noted above, and as used in this application, the term "sorbent material" refers to a material that reversibly binds the working fluid, in a chemical or physical sense. Sorbent materials include adsorbents, and absorbents.

Sorbent materials that can be used in embodiments of the present invention include, but are not limited to, metal-organic framework-based (MOF-based) sorbents, zeolitic imidazole framework (ZIF) sorbent materials, zeolites and carbon.

MOF-based sorbents include, but are not limited to, MOF-based sorbents with a plurality of metal, metal oxide, metal cluster or metal oxide cluster building units. As disclosed in International Published Application No. WO 2007/111738, which is hereby incorporated by reference in its entirety, the metal can be selected from the transition metals in the periodic table, and beryllium. Exemplary metals include zinc (Zn), cadmium (Cd), mercury (Hg), and beryllium (Be). The metal building units can be linked by organic compounds to form a porous structure, where the organic compounds for linking the adjacent metal building units can include 1,3,5-benzenetribenzoate (BTB); 1,4-benzenedicarboxylate (BDC); cyclobutyl 1,4-benzenedicarboxylate (CB BDC); 2-amino 1,4 benzenedicarboxylate (H2N BDC); tetrahydropyrene 2,7-dicarboxylate (HPDC); terphenyl dicarboxylate (TPDC); 2,6 naphthalene dicarboxylate (2,6-NDC); pyrene 2,7-dicarboxylate (PDC); biphenyl dicarboxylate (BDC); or any dicarboxylate having phenyl compounds.

Specific materials MOF-based sorbent materials include: MOF-177, a material having a general formula of $Zn_4O(1,3,5$-benzenetribenzoate$)_2$; MOF-5, also known as IRMOF-I, a material having a general formula of $Zn_4O(1,4$-benzenedicarboxylate$)_3$; IRMOF-6, a material having a general formula of $Zn_4O$(cyclobutyl 1,4-benzenedicarboxylate); IRMOF-3, a material having a general formula of $Zn_4O(2$-amino 1,4 benzenedicarboxylate$)_3$; and IRMOF-11, a material having a general formula of $Zn_4O$(terphenyl dicarboxylate$)_3$, or $Zn_4O$ (tetrahydropyrene 2,7-dicarboxylate$)_3$; and IRMOF-8, a material having a general formula of $Zn_4O(2,6$ naphthalene dicarboxylate$)_3$.

Exemplary zeolitic imidazole framework (ZIF) sorbent materials include, but are not limited to, ZIF-68, ZIF-60, ZIF-70, ZIF-95, ZIF-100 developed at the University of California at Los Angeles and generally discussed in Nature 453, 207-211 (8 May 2008), hereby incorporated by reference in its entirety.

Zeolite adsorbent materials include, but are not limited to, aluminosilicates that are represented by the formula $M_{2/n}O.Al_2O_3.ySiO_2.wH_2O$, where y is 2 or greater, M is the charge balancing cation, such as sodium, potassium, magnesium and calcium, N is the cation valence, and w represents the moles of water contained in the zeolitic voids. Examples of zeolites that can be included in the methods and systems of the present application include natural and synthetic zeolites.

Natural zeolites include, but are not limited to, chabazite (CAS Registry No. 12251-32-0; typical formula $Ca_2[(AlO_2)_4(SiO_2)_8].13H_2O$), mordenite (CAS Registry No. 12173-98-7; typical formula $Na_8[(AlO_2)_8(SiO_2)_{40}].24H_2O$), erionite (CAS Registry No. 12150-42-8; typical formula $(Ca, Mg, Na_2, K_2)_{4.5}[(AlO_2)_9(SiO_2)_{27}].27H_2O$), faujasite (CAS Registry No. 12173-28-3, typical formula $(Ca, Mg, Na_2, K_2)_{29.5}[(AlO_2)_{59}(SiO_2)_{133}].235H_2O$), clinoptilolite (CAS Registry No. 12321-85-6, typical formula $Na_6[(AlO_2)_6(SiO_2)_{30}].24H_2O$) and phillipsite (typical formula: $(0.5Ca, Na, K)_3[(AlO_2)_3(SiO_2)_5].6H_2O$).

Synthetic zeolites include, but are not limited to, zeolite A (typical formula: $Na_{12}[(AlO_2)_{12}(SiO_2)_{12}].27H_2O$), zeolite X (CAS Registry No. 68989-23-1; typical formula: $Na_{86}[AlO_2)_{86}(SiO_2)_{106}].264H_2O$), zeolite Y (typical formula: $Na_{56}[(AlO_2)_{56}(SiO_2)_{136}].250H_2O$), zeolite L (typical formula: $K_9[(AlO_2)_9(SiO_2)_{27}].22H_2O$), zeolite omega (typical formula: $Na_{6.8}TMA_{1.6}[AlO_2)_8(SiO_2)_{28}].21H_2O$, where TMA is tetramethylammonium) and ZSM-5 (typical formula: $(Na, TPA)_3[(AlO_2)_3(SiO_2)_{93}].16H_2O$, where TPA is tetrapropylammonium).

Zeolites that can be used in the embodiments of the present application also include the zeolites disclosed in the Encyclopedia of Chemical Technology by Kirk-Othmer, Volume 16, Fourth Edition, under the heading "Molecular Sieves," which is hereby incorporated by reference in its entirety.

Synthetic zeolite sorbent materials are commercially available, such as under the Sylosiv® brand from W.R. Grace and Co. (Columbia, Md.) and from Chengdu Beyond Chemical (Sichuan, P.R. China). For example, Sylosiv® A10 is one commercially available zeolite 13 X product.

Working Fluids

Non-limiting examples of working fluids that can be used in accordance with the present application include carbon dioxide, methane, ethane, propane, butane, ammonia and chlorofluorocarbons (e.g., Freon™).

Selection of Sorbent Materials and Working Fluids

In accordance with another aspect of the invention, a method is provided for selecting a sorbent material and a working fluid for use in combination in a unutilized-heat sorbent system within a chemical processing or petrochemical refining operation. The selection of the proper combination of sorbent material and working fluid, according to embodiments of the presently disclosed subject matter, can be used in conjunction with the process modifications and apparatus designs also described herein.

The selection method generally includes providing a sorbent material in a vessel, introducing a proposed working fluid into the vessel to a predetermined sorbing pressure, allowing the chamber to reach equilibrium at the predetermined sorbing pressure (e.g. 1 atm), securing the chamber to prevent the escape of working fluid, heating the secured chamber to a predetermined temperature (e.g., 348K), measuring internal pressure within the secured chamber after the sorbent material has reached the predetermined temperature and selecting the sorbent and the working fluid for use in combination if the measured internal pressure within the secured chamber is at least 1.2 times, or 1.5 times the adsorbing pressure. In one embodiment, the sorbent material and the working fluid for use in combination is selected if the measured internal pressure within the secured chamber is at least two times, or at least three times, or at least four times, or at least six times, or at least eight times the sorbing pressure. The sorption system can be used to provide refrigeration, to drive a turbine to provide electricity or to drive a work shaft or other driver to perform work.

Heat of Sorption

Preferably, the sorbent material and fluid couple has an average heat of sorption (Q) from about 2 kcal/mole to about 20 kcal/mole, and more preferably from about 4 kcal/mole to about 10 kcal/mole for heat sources up to 600K. The heat of sorption should be between 2 kcal/mole to about 40 kcal/mole if a higher temperature heat source (e.g., great than 600K and up to 1200K) is available. The sorbent material should also have a high capacity for the fluid.

Uses of Adsorbent Systems of the Present Application

The adsorbent systems of the present application can be used in various applications provided the setting allows for the presence of a vessel that contains a sorbent material, a supply of working fluid, a heat supply and means to effectively direct the desorbed working fluid to an expansion device to provide refrigeration or a driver device to provide electricity or work. For example, the desorbed gas may be directed to a Joule-Thompson expansion valve, to provide refrigeration. Alternatively, the desorbed working fluid can be directed to a turbine to provide electricity or a work shaft to provide work.

Possible applications for sorption systems of the present application include residential (for generating air conditioning in the summer and a heat pump in the winter), vehicular (where the on-board air conditioning utilizes exhaust heat) and industrial (refining and chemical plants).

In a preferred embodiment of the present application, the adsorbent system is used within a chemical or petrochemical plant, and the desorbed working fluid is used to provide refrigeration to aid in other process areas, particularly areas that rely on temperature differences to separate components of a mixture. For example, the refrigeration can be used to recover liquefied petroleum gas (LPG, C3+) from flue gases going up a stack, or the refrigeration can be used to operate condensers to improve the effectiveness of vacuum distillation columns, particularly in the summer months.

By proper selection of the adsorbent and working fluid, the sorbent system can make effective use of lower grade heat than previously provided by adsorption systems in the prior art. For example, in one embodiment of the present application, the heat supply is "unutilized heat" which has a temperature of from about 70° C. to about 300° C. (343K to about 573K), more preferably from about 90° C. to about 180° C. (363K to about 453K).

Exemplary Embodiment Using Zeolite 13X and $CO_2$

Figure 9:
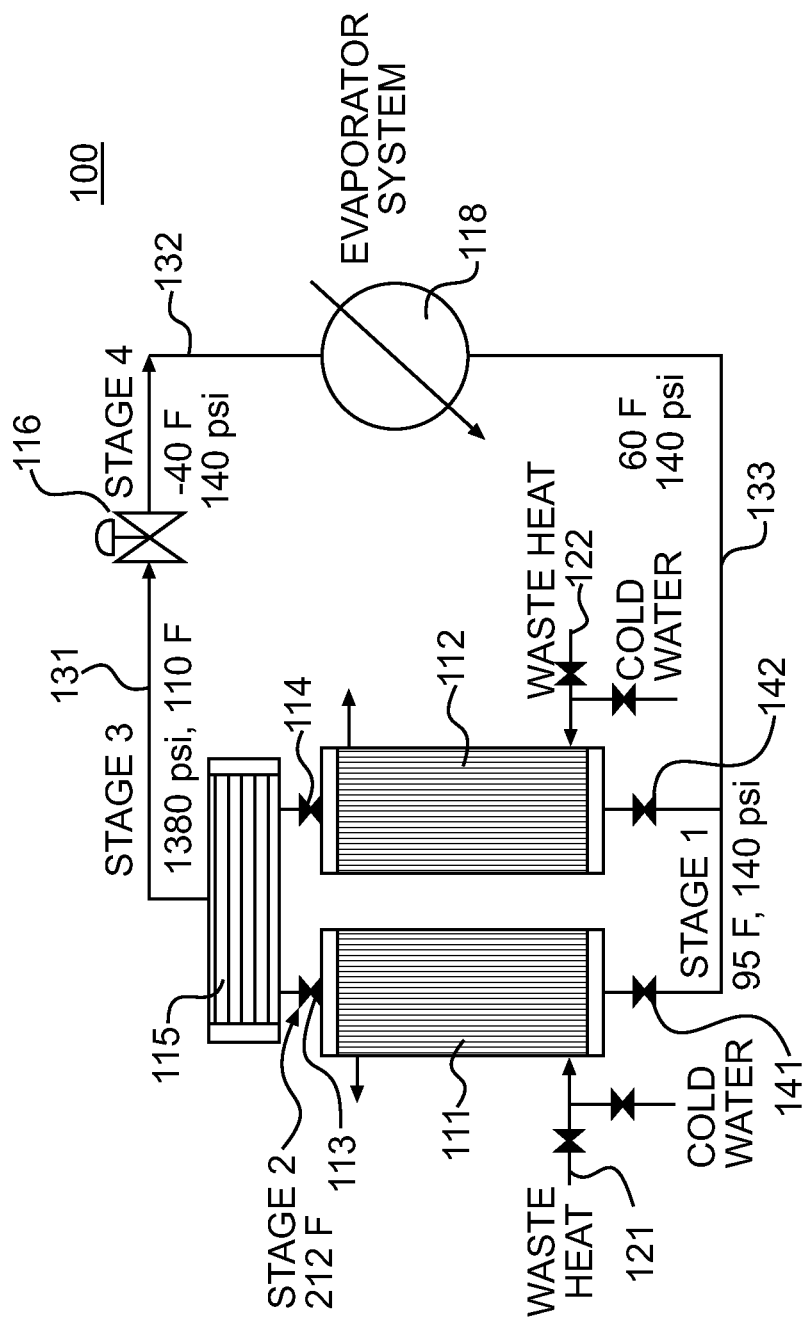
FIG. 9 is a schematic of an exemplary adsorption system using zeolite 13X and carbon dioxide.
Figure 10:
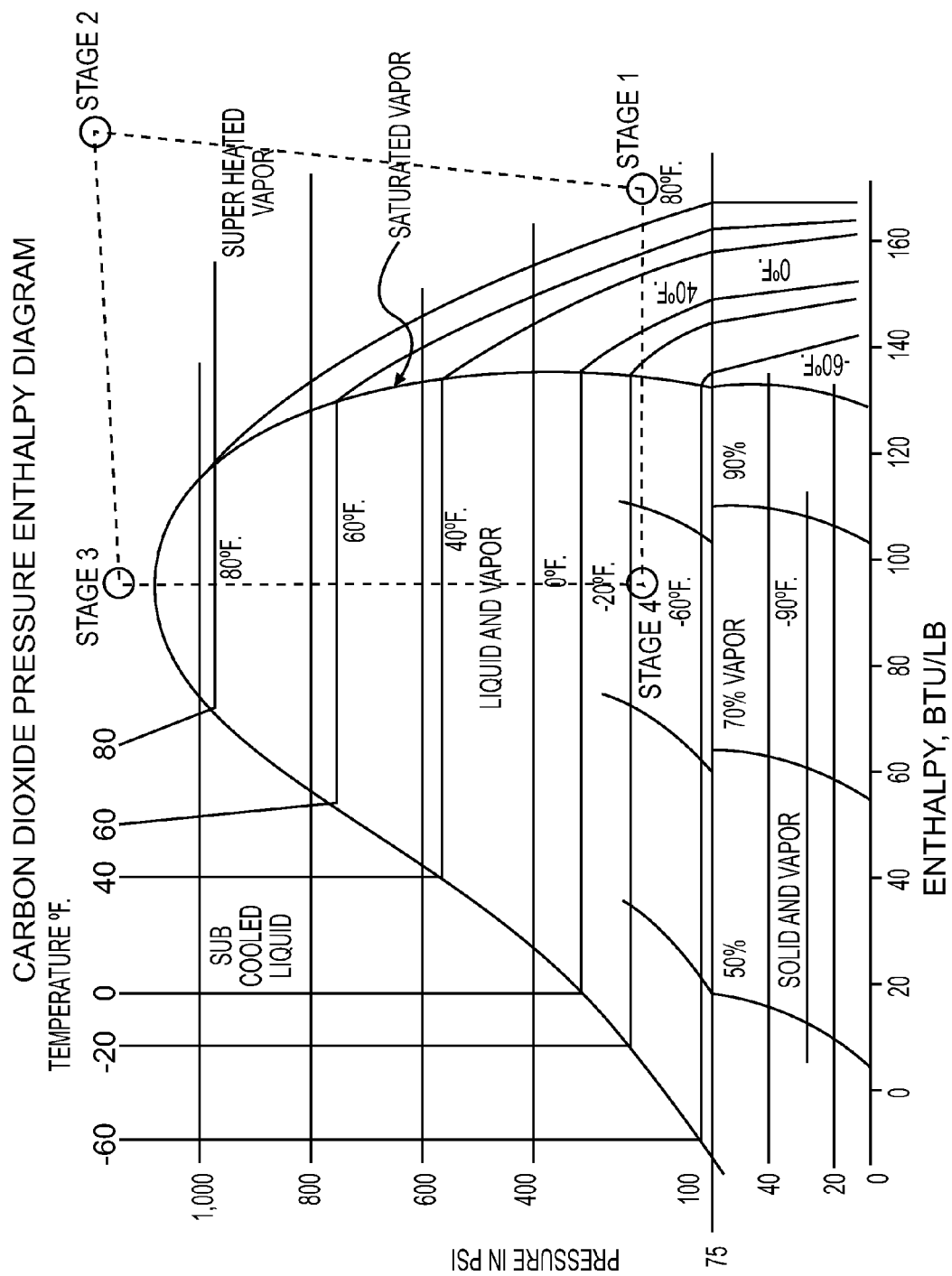
FIGS. 10 and 11 are Mollier diagrams for carbon dioxide at various temperatures and pressures.
Figure 11:
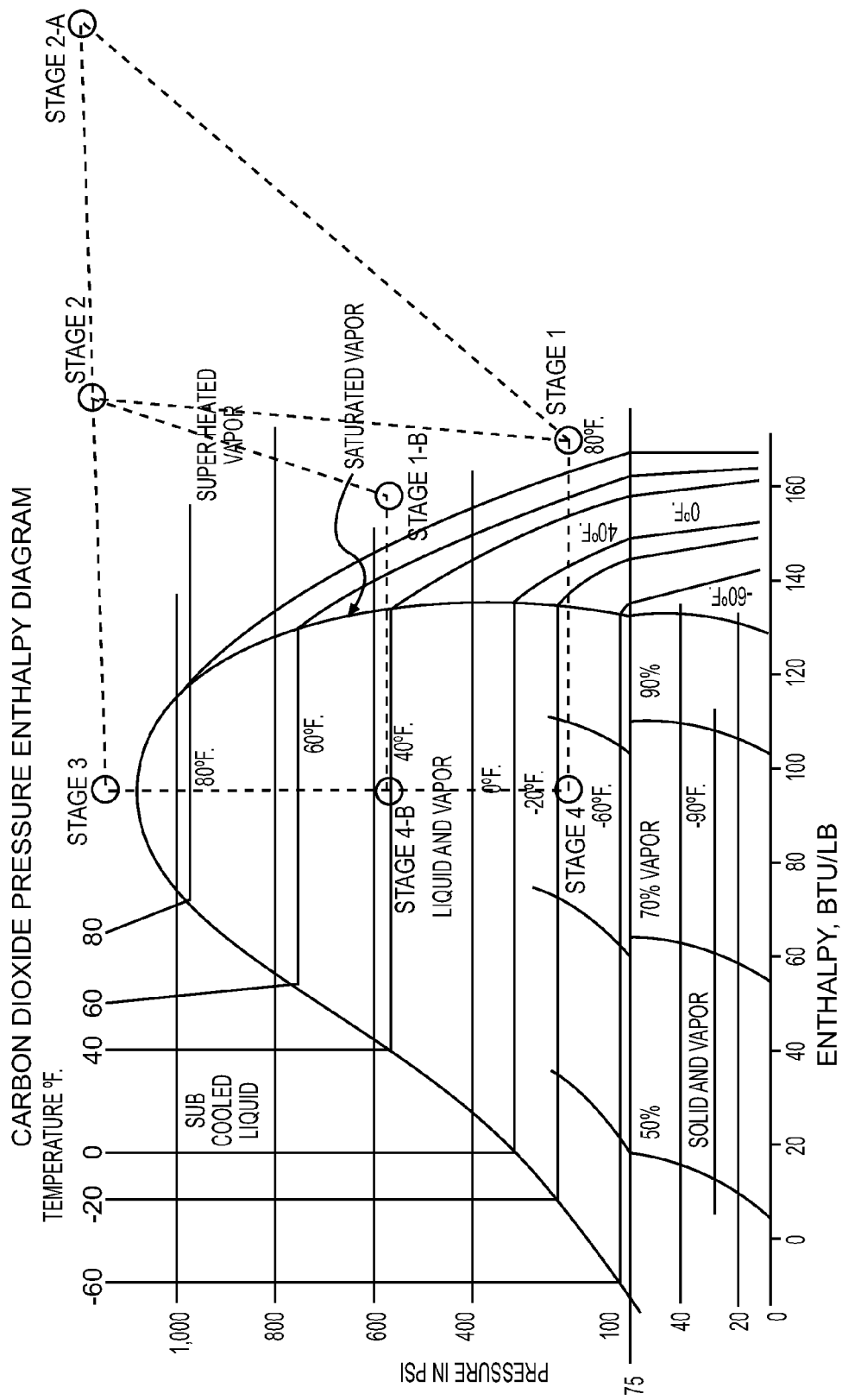

For purposes of illustration and not limitation, a zeolite 13X/$CO_2$ sorption chilling system 100 is provided in one representative embodiment of the present application, as depicted schematically in FIG. 9. A Mollier Diagram for carbon dioxide at various temperatures and pressures for this embodiment is shown in FIGS. 10 and 11 for reference. In this embodiment, two vessels 111 and 112 are maintained in an adsorption mode and a desorption mode, respectively. When one vessel is in the adsorption mode, the other vessel is in the desorption mode and vice versa. In the present embodiment, the sorbent material is zeolite 13X. The working fluid is $CO_2$. For the vessel in the adsorption mode, carbon dioxide is adsorbed by the zeolite 13X at a pressure of about 140 psi and a temperature of about 95° F. These conditions are denoted in FIG. 10 as Stage 1.

After adsorption is complete, the adsorbent bed is isolated by operating the relevant valve (e.g., valve 141 for vessel 111 or valve 142 for vessel 112) and heated using unutilized heat from petroleum refining or chemical processes. The adsorption mode can last for several seconds (e.g., 10 seconds) to several minutes. The duration of the adsorption mode varies based upon the adsorbent material and working fluid selected. Unutilized heat is applied to the vessel in order to desorb the $CO_2$, thus initiating the desorption mode. Using the unutilized heat, the vessel is heated to about 212° F. in this particular embodiment. A pressurized stream is generated due to desorption of $CO_2$ from the 13X sorbent material as the adsorbent bed heats to 212° F. In response to operation of a back pressure regulator valve ((i.e., valve 113 for vessel 111 or valve 114 for vessel 112), high pressure $CO_2$ is released from the vessel to pressure damper or cooler 115 at a preset pressure (e.g., ~1400 psig), which is denoted in FIG. 10 as stage 2. The temperature of the $CO_2$ is approximately 212° F.

The pressurized $CO_2$ stream is cooled to the pressure damper/cooler 115 to approximately 110° F., which is denoted as stage 3 in FIG. 10. As a result, the pressure of the cooled $CO_2$ stream in the line 131 is approximately 1380 psi (P1) and the temperature is approximately 110° F. The cooled working fluid stream is subsequently expanded adiabatically using an expansion valve 116 to about 140 psi (P2) and −40° F. (T3), which is denoted as stage 4 in FIG. 10. The expansion valve 116 may be a flow restrictor or a needle valve to restrict but not stop flow. This cooled stream can be used as a high quality refrigeration load for many different applications within refineries or similar facilities where unutilized heat is readily available. For example, the refrigerated $CO_2$ can be directed to a heat exchanger 118 to chill process streams within refineries and chemical plants.

After performing the refrigeration operation within the exchanger 118, the carbon dioxide of this representative embodiment can have a temperature of about 60° F. to 100° F. (T2) and a pressure of about 140 psi (P2). The carbon dioxide working fluid is then recycled back to one of the vessels for use in a subsequent adsorption mode.

The $CO_2$/zeolite 13X system has a pressure index of greater than 3.5. The pressure index is determined in accordance with the procedure set forth above.

Alternatively, higher temperature heat can be applied to desorb more working fluid molecules from the adsorption bed. As shown in FIG. 11, and for purposes of illustration and not limitation, stage 2 is now stage 2A, in which a higher-temperature unutilized heat source is used to heat the bed to 450° F., instead of 212° F. This pressurized stream is to be cooled to 110° F. before expansion. It, therefore, will require much higher amount of cooling media at stage 2. The efficiency of this alternative system based on a 450° F. heat source, using the selection of zeolite 13X and carbon dioxide, will be significantly lower as it requires higher level of heating and cooling. It is understood, however, that a selection of sorbent material and working fluid based on a higher level heat pressure index can produce a sorption system that is better suited for a higher quality of heat.

Alternatively, a system can be operated at lower pressure differentials during adiabatic expansion. FIG. 11 demonstrates a system where stages 1-B and 4-B are at higher adsorption pressures. This will also reduce the efficiency of the system. By not expanding the working fluid to a lower pressure cooling may be limited. Nevertheless, such an embodiment can be useful for providing refrigeration.

For purposes of the above discussion, each vessel can be a shell-in-tube type configuration with adsorbents in the tube(s). The vessel may have an inner diameter of about 5 ft and contains tubes having a length of about 20 ft. The vessel can also be, for example, a protected monolith adsorbent bed with channels, such as the disclosed in FIG. 5 of the present application. Other vessel sizes are considered to be well within the scope of the presently disclosed subject matter.

Furthermore, the present invention is not limited to shell-in-tube heat exchangers, other exchangers and other vessels may be selected based on ordinary skill in the art and are considered to be well within the scope of the present invention.

This representative embodiment is provided for exemplary purposes; neither the application nor the invention is limited to the specific embodiments discussed above, or elsewhere in the application.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosures of each of which is incorporated herein by reference in its entirety for all purposes.

The invention claimed is:

1. A method of utilizing waste heat to create a pressurized working fluid comprising:
    (a) introducing a feed of a working fluid to a vessel containing an adsorbent material, and adsorbing the working fluid on the adsorbent material;
    (b) introducing a feed of waste heat to a heat exchanger external to the vessel containing the adsorbent material, and heating a feed of heating/cooling fluid in the heat exchanger with the waste heat;
    (c) introducing the heated heating/cooling fluid from the heat exchanger to the vessel, and contacting the adsorbent material directly with the heating/cooling fluid without wetting the adsorbent material with the heating/cooling fluid, and desorbing the adsorbed working fluid from the adsorbent thereby pressurizing the working fluid;
    (d) directing the pressurized working fluid from the vessel to a work component, and expanding the working fluid in the work component thereby cooling the working fluid.

2. The method of claim 1, wherein the work component comprises a turboexpander.

3. A method according to claim 1 in which the adsorbent material comprises a channeled material with a surface layer that protects the adsorbent material from direct contact with the heating/cooling fluid.

4. A method according to claim 1 in which the working fluid comprises carbon dioxide.

5. A method according to claim 1 in which the adsorbent material comprises a channeled material with a liquid film coating that protects the adsorbent material from direct contact with the heating/cooling fluid while allowing for diffusion of the working fluid for adsorption and desorption on the adsorbent material.

6. A method according to claim 3 in which the surface layer comprises a hydrophobic polymeric layer.

7. A method according to claim 5 in which the liquid of the liquid film coating comprises triethylene glycol.

8. The method of claim 1, wherein work component comprises an expansion valve.

9. A method of creating a pressurized working fluid for work comprising:
    (a) supplying heat to a first zone and heating the first zone to a first temperature;
    (b) cooling a second zone to a second temperature lower than the first temperature;
    (c) passing a stream of working fluid through the zone and cool the working fluid;
    (d) adsorbing the cooled working fluid on an adsorbent material in the second zone;
    (e) moving the adsorbent material with the adsorbed working fluid from the second zone to the first zone, heating the adsorbing working fluid, and desorbing the working fluid from the adsorbent to form pressurized working fluid; and
    (f) directing the pressurized working fluid from the first zone to a work component and expanding the pressurized working fluid in the work component.

10. The method of claim 6, wherein a lock-hopper device is employed to move the adsorbent material between the first zone and the second zone.

11. The method of claim 9, wherein a piston device is employed to move the adsorbent material between the first zone and the second zone.

12. The method of claim 9, wherein the adsorbent material is moved between the first zone and the second zone on a rotary wheel.

13. The method of claim 9, wherein the work component comprises an expansion valve.

14. The method of claim 9, wherein the work component comprises a turboexpander.

15. The method of claim 10, wherein the first zone and the second zone are located in separate vessels.

16. The method of claim 11, wherein the first zone and the second zone are located within the same vessel.

* * * * *